United States Patent
Li et al.

(10) Patent No.: US 9,917,332 B2
(45) Date of Patent: Mar. 13, 2018

(54) POWER SUPPLY AND ELECTRONIC CIGARETTE HAVING SAME

(71) Applicant: Shenzhen First Union Technology Co., Ltd., Shenzhen, Guangdong (CN)

(72) Inventors: Yonghai Li, Shenzhen (CN); Zhongli Xu, Shenzhen (CN)

(73) Assignee: Shenzhen First Union Technology Co., Ltd., Shenzhen (CN)

( * ) Notice: Subject to any disclaimer, the term of this patent is extended or adjusted under 35 U.S.C. 154(b) by 925 days.

(21) Appl. No.: 14/315,338

(22) Filed: Jun. 26, 2014

(65) Prior Publication Data
US 2015/0059786 A1   Mar. 5, 2015

(30) Foreign Application Priority Data
Aug. 27, 2013   (CN) .................. 2013 2 0524887 U

(51) Int. Cl.
| H01M 2/10 | (2006.01) |
| H01M 10/42 | (2006.01) |
| A24F 47/00 | (2006.01) |
| H02J 7/00 | (2006.01) |

(52) U.S. Cl.
CPC ......... *H01M 10/425* (2013.01); *A24F 47/008* (2013.01); *H01M 2/105* (2013.01); *H01M 2/1055* (2013.01); *H02J 7/0042* (2013.01); *H01M 2220/30* (2013.01)

(58) Field of Classification Search
None
See application file for complete search history.

(56) References Cited

U.S. PATENT DOCUMENTS

2010/0231142 A1*  9/2010  Yoon .................. F21L 4/027
                                                                315/312

* cited by examiner

*Primary Examiner* — Jonathan Crepeau

(57) ABSTRACT

A power supply for an electronic cigarette, includes a shell; a battery assembly received in the shell; an electrode assembly arranged at an end of the shell; a first electrical contact assembly arranged between the battery assembly and the electrode assembly. The first electrical contact assembly includes a first electrode plate electrically connected to the battery assembly, and a pair of first pins electrically connected to the electrode assembly. The first pins are electrically contacting the first electrode plate. An electronic cigarette using the power supply is also provided.

8 Claims, 7 Drawing Sheets

POWER SUPPLY AND ELECTRONIC CIGARETTE HAVING SAME

CROSS REFERENCE TO RELATED APPLICATIONS

The present application claims the benefit of Chinese Patent Application No. 201320524887.5 filed on Aug. 27, 2013; the contents of which are hereby incorporated by reference.

BACKGROUND

1. Technical Field

The present invention relates to power supplies, and particularly to a power supply for an electronic cigarette and an electronic cigarette having the power supply.

2. Description of Related Art

Electronic cigarettes are similar to conventional cigarettes in appearance and taste, but less harmful to human's health, so that electronic cigarettes are widely used for helping people to quit smoke. A typical electronic cigarette includes an atomizer and a power supply, and the power supply usually includes a battery and a plurality of conductive components electrically connected to the battery via bonding wires.

However, with the above configuration, assembling the power supply is complicated, mistakes like short circuits may occur, and it is hard to be carry out automatic assembly.

What is needed, therefore, is a power supply and an electronic cigarette which can overcome the above shortcomings.

BRIEF DESCRIPTION OF THE DRAWINGS

Many aspects of the present power supply and electronic cigarette can be better understood with reference to the following drawings. The components in the drawings are not necessarily drawn to scale, the emphasis instead being placed upon clearly illustrating the principles of the present power supply and electronic cigarette. Moreover, in the drawings, like reference numerals designate corresponding parts throughout the several views.

DETAILED DESCRIPTION

Embodiments of the present atomizing device and electronic cigarette will now be described in detail below and with references to the drawings.

Figure 1:
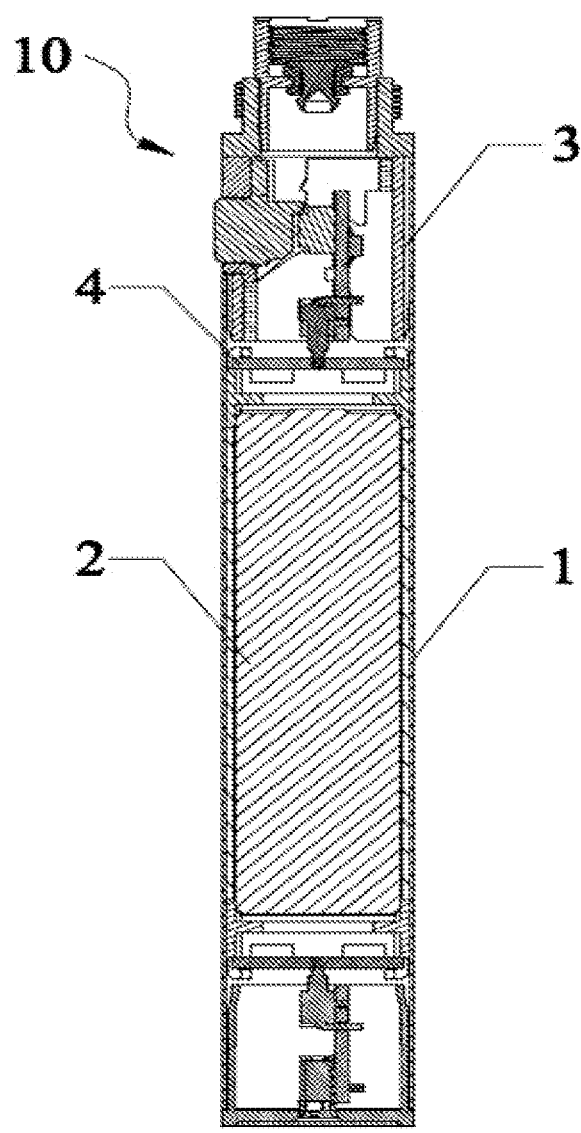
FIG. 1 is a schematic cross sectional view of a power supply of an electronic cigarette in accordance with a first embodiment.
Figure 2:
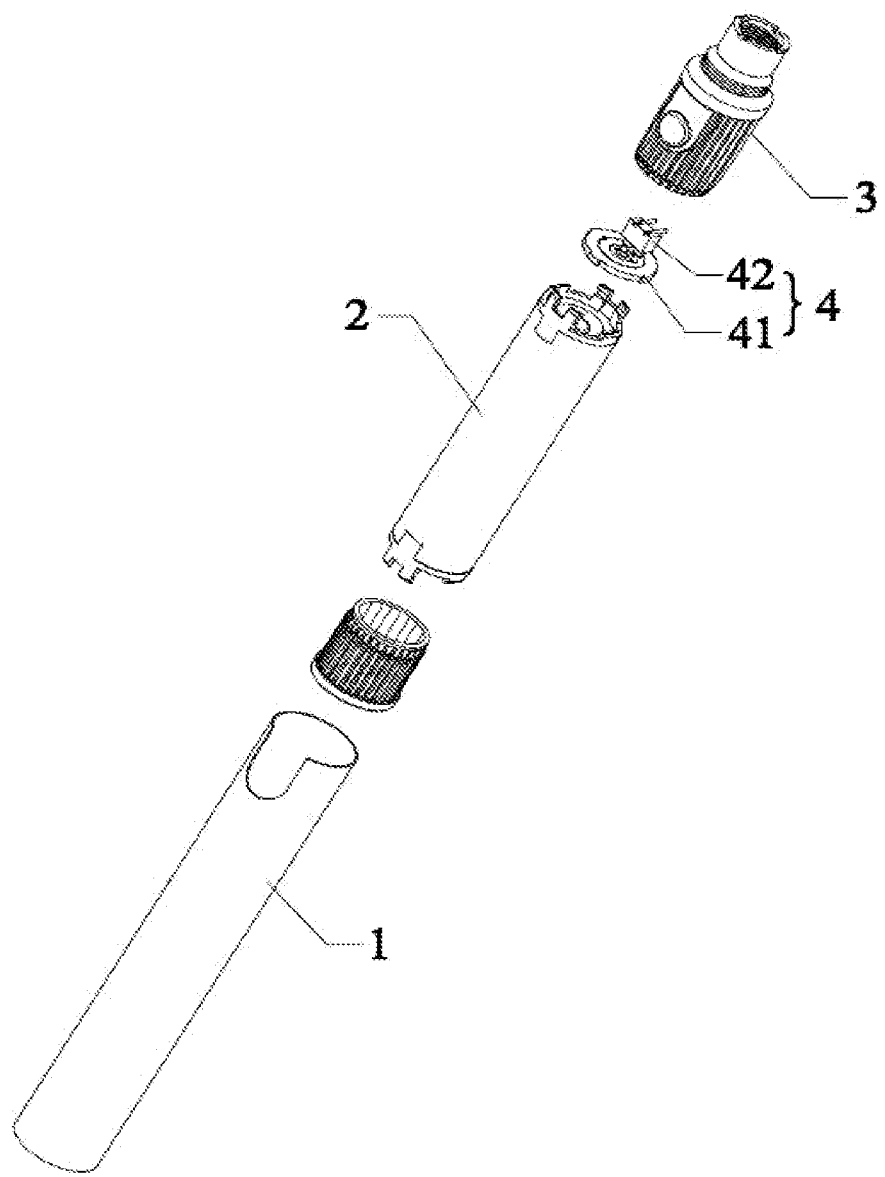
FIG. 2 is an exploded view of the power supply in accordance with the first embodiment.

Referring to FIGS. 1 and 2, a power supply 10 of an electronic cigarette in accordance with a first embodiment is provided. The power supply 10 includes a shell 1, a battery assembly 2, an electrode assembly 3 and a first electrical contact assembly 4. The battery assembly 2 is received in the shell 1, the electrode assembly 3 is located at an end of the shell 1, and the first electrical contact assembly 4 is arranged between the electrode assembly 3 and the battery assembly 2.

Figure 3:
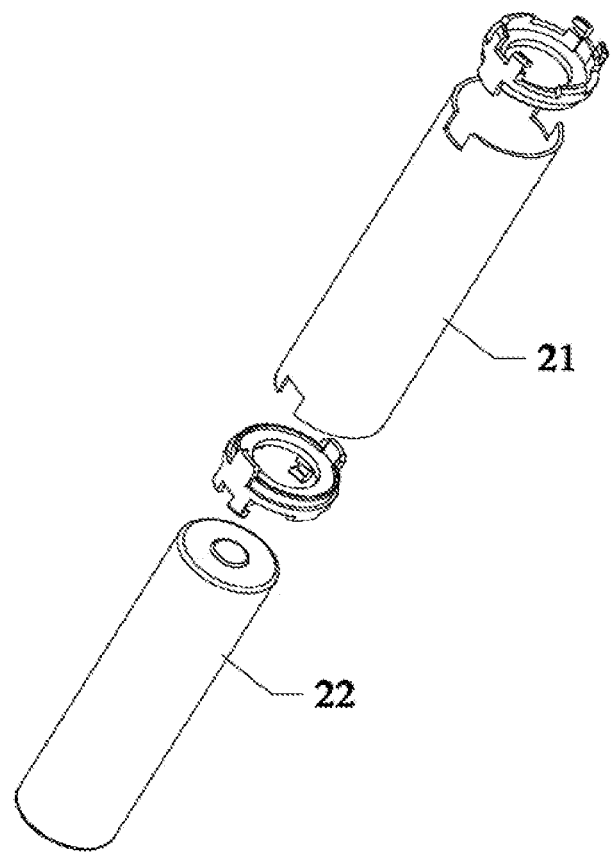
FIG. 3 is an exploded view of a battery assembly of FIG. 2.

Referring to FIG. 3, the battery assembly 2 includes a battery case 21 and a battery 22 arranged in the battery case 21. The battery case 21 can protect the battery 22 without damage to the battery 22.

The first electrical contact assembly 4 includes an electrode plate 41, and a pair of first pins 42 electrically contacting the electrode plate 41. The electrode plate 41 is positioned at an upper end of the battery case 21 and electrically connected to the battery 22.

Figure 4:
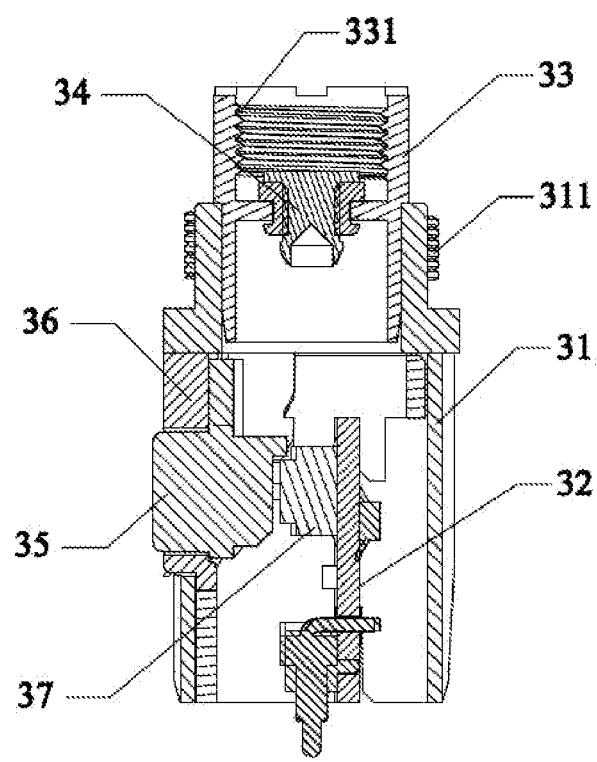
FIG. 4 is a schematic cross sectional view of an electrode assembly of FIG. 2.

Referring to FIG. 4, the electrode assembly 3 includes a sleeve 31, a circuit board 32 arranged in the sleeve 31, a tubular electrode 33 and a central electrode 34. The sleeve 31 is engaged in the shell 1. The first pins 42 are fixed to the circuit board 32 and electrically connected to the circuit board 32. The tubular electrode 33 and the central electrode 34 are spaced by an insulator. The tubular electrode 33 is connected to the sleeve 31, and configured as a negative electrode. The central electrode 34 is configured as a positive electrode.

In addition, the sleeve 31 has an outer screw 311, the tubular electrode 33 has an inner screw 331. The outer screw 311 and the inner screw 331 are configured to connect different atomizers.

In the present embodiment, the first pins 42 are resilient between the circuit board 32 and the electrode plate 41, so that a distance between the circuit board 32 and the electrode plate 41 can be adjusted, and good connection is formed between the circuit board 32 and the electrode plate 41.

The electrode assembly 3 further includes a button 35, and the button 35 is seated on the sleeve 31 via a button base 36, and is connected to the circuit board 32 via a touch switch 37. The button 35 thus controls the power supply 10 to work on and off.

Concluded from the above description, the power supply 10 is composed of a number of assemblies, and each assembly can be removed and replaced independently.

Figure 5:
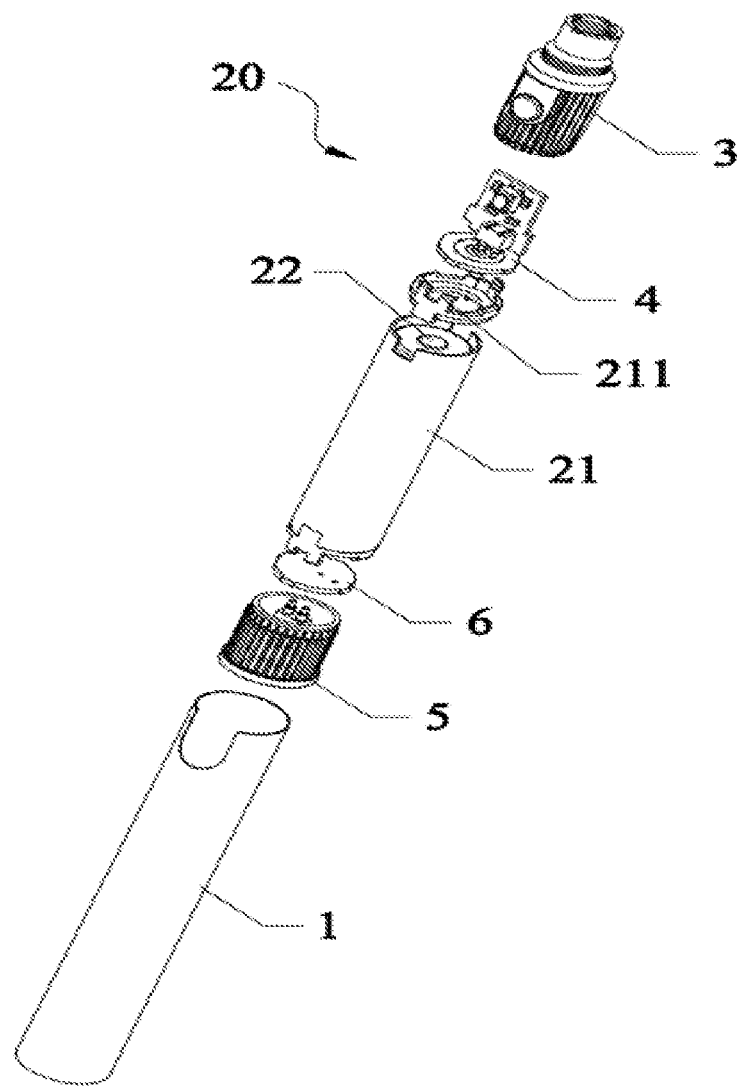
FIG. 5 is a schematic cross sectional view of a power supply of an electronic cigarette in accordance with a second embodiment.
Figure 6:
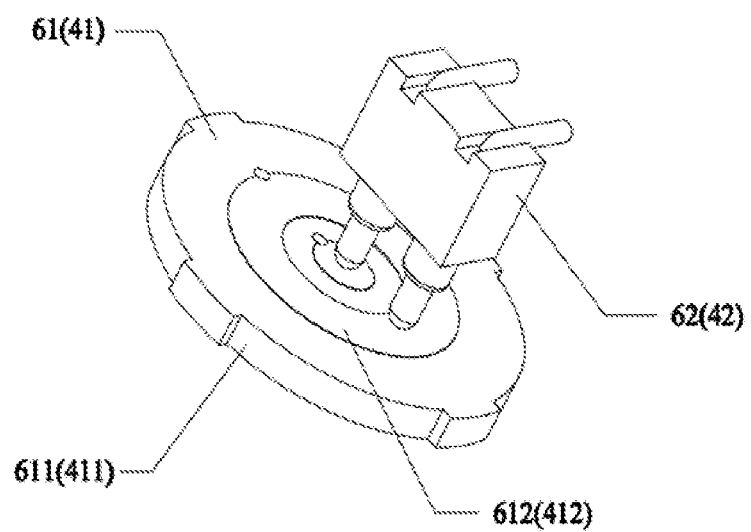
FIG. 6 is a schematic isometric view of a first or a second electrical contact assembly.

Referring to FIG. 5 and FIG. 6, a power supply 20 in accordance with a second embodiment is provided. The power supply 20 is similar to the power supply 10, however, the power supply 20 further includes an endpiece 5 coupling to the shell 1, and a second electrical contact assembly 6. The endpiece 5 includes a housing and an integrated circuit formed in the housing. The second electrical contact assembly 6 includes a second electrode plate 61 and a pair of second pins 62 electrically contacting the second electrode plate 61. The electrode plate 61 is positioned at a lower end of the battery case 21, and is electrically connected to the battery 22. The second pins 62 are also resilient, and are fixed to and electrically connected to the integrated circuit of the endpiece 5.

The second electrical contact assembly 6 is the same as the first electrical contact assembly 4. See FIG. 6, the second electrode plate 61 (or the first electrode plate 41) includes a round substrate 611 (or 411), and the round substrate 611 (or 411) has two circular conductive regions 612 (or 412) formed at one side thereof, and two welding spots formed at the other side and electrically connected to the circular conductive regions 612 (or 412). The circular conductive regions 612 (or 412) are concentric and are spaced by insulated material. The welding spots are electrically connected to an anode and a cathode of the battery 22 via wires, such that the circular conductive regions 612 (or 412) are connected to the battery 22. The second pins 62 (or the first pins 42) electrically contact the respective circular conductive regions 612 (or 412).

In order to fix the first electrode plate 41 and the second electrode plate 61, each end of the battery case 21 has a plurality of holding portions 211 configured for holding the respective first electrode plate 41 and the second electrode plate 61 in position, such that the first electrical contact assembly 4 and the second electrical contact assembly 6 are easily to be installed on the battery case 21.

In the present embodiment, both the electrode assembly 3 and the endpiece 5 are tightly engaged in the shell 1, by which packaging the power supply 20 is easy, and a glue for adhering can be voided. In addition, the electrode assembly 3 and the endpiece 5 are connected to the battery assembly 2 via electrical contact assemblies, by which a direction of related components can be easily recognized.

With the above advantages, automatic assembly of the power supply can be carried out.

Figure 7:
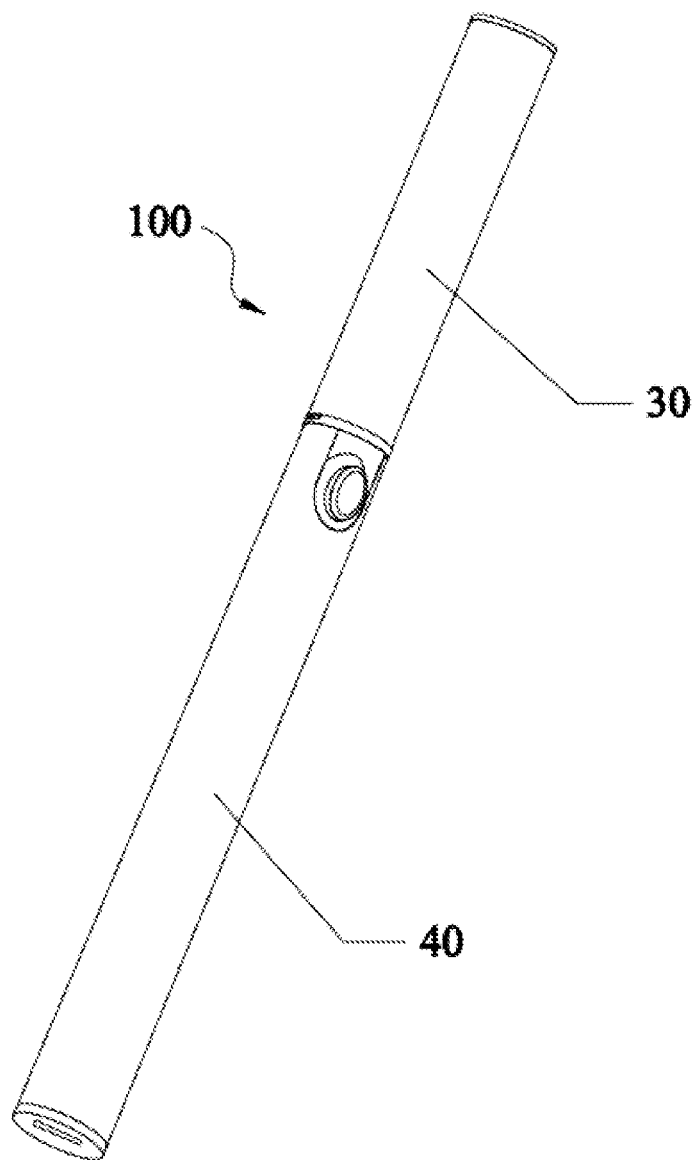
FIG. 7 is a schematic cross sectional view of an electronic cigarette in accordance with a third embodiment.

Referring to FIG. 7, an electronic cigarette 100 in accordance with a third embodiment is provided. The electronic cigarette 100 includes an atomizer 30 and a power supply 40. The power supply 40 may be the same as the above described power supply 10 or 20.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A power supply for an electronic cigarette, comprising:
   a shell;
   a battery assembly received in the shell;
   an electrode assembly arranged at an end of the shell; and
   a first electrical contact assembly arranged between the battery assembly and the electrode assembly, the first electrical contact assembly comprising a first electrode plate electrically connected to the battery assembly, and a pair of first pins electrically connected to the electrode assembly, the first pins electrically contacting the first electrode plate; and
   an endpiece coupled to the other end of the shell, a second electrical contact assembly arranged between the endpiece and the battery assembly, the endpiece comprising a housing and an integrated circuit formed in the housing, the second electrical contact assembly comprising a second electrode plate electrically connected to the battery assembly, and a pair of second pins fixed to and electrically connected to the integrated circuit of the endpiece, the second pins being electrically contacting the second electrode plate.

2. The power supply of claim 1, wherein the electrode assembly comprises a sleeve engaged with the shell, and a circuit board arranged in the sleeve, the first pins being fixed to and electrically connected to the circuit board.

3. The power supply of claim 2, wherein the first pins are resilient.

4. The power supply of claim 2, wherein the electrode assembly further comprises a tubular electrode engaged in the sleeve, and a central electrode positioned in the tubular electrode and insulatedly spaced from the tubular electrode.

5. The power supply of claim 4, wherein the electrode assembly further comprises a button arranged on the sleeve and connected to the circuit board.

6. The power supply of claim 1, wherein each of the first electrode plate and the second electrode plate comprises a round substrate, and the round substrate comprises two circular conductive regions formed at one side thereof and insulatedly spaced from each other, and two welding spots formed at the other side thereof and electrically connected to the circular conductive regions, the welding spots being electrically connected to an anode and a cathode of the battery assembly via wires, and the first pins and the second pins electrically contacting the circular conductive regions.

7. The power supply of claim 1, wherein the battery assembly comprises a battery and a battery case receiving the battery, the first electrode plate and the second electrode plate are positioned at two ends of the battery case.

8. The power supply of claim 7, wherein the battery case comprises at least three holding portions configured to hold the first electrode plate and the second electrode plate in position.

* * * * *